July 18, 1933.  G. A. MEAD  1,918,854
TROLLEY HEAD
Filed Aug. 29, 1931

Inventor
By George A. Mead
Attorney

Patented July 18, 1933

1,918,854

UNITED STATES PATENT OFFICE

GEORGE A. MEAD, OF MANSFIELD, OHIO, ASSIGNOR TO THE OHIO BRASS COMPANY, OF MANSFIELD, OHIO, A CORPORATION OF NEW JERSEY

TROLLEY HEAD

Application filed August 29, 1931. Serial No. 560,221.

My invention relates to trolley heads for use at the end of a trolley pole for collecting current from a trolley wire. The object of my invention is to provide a simple, efficient arrangement for collecting current and conducting it to a moving vehicle and to insulate the contacting device both electrically and acoustically from the trolley pole.

My invention resides in the new and novel construction, combination and relation of the parts herein described and shown in the drawing accompanying this specification.

In the drawing:—

Figure 1:
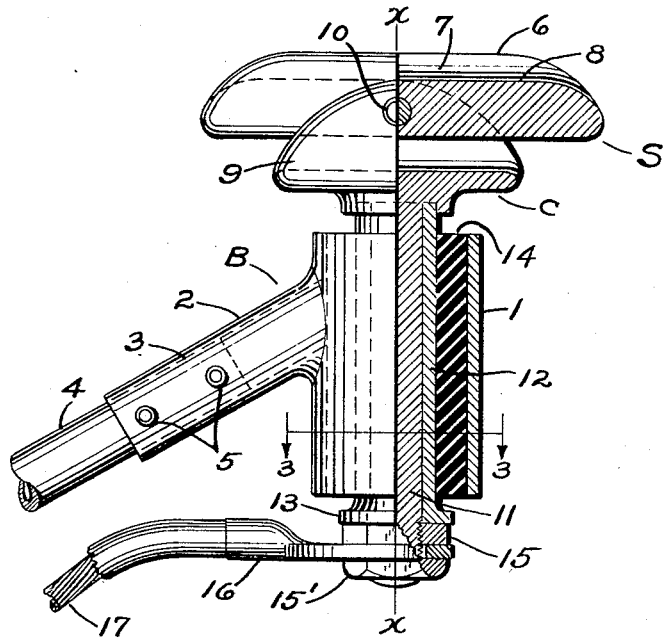
Fig. 1 is a side view in quarter section of my invention.
Figure 2:
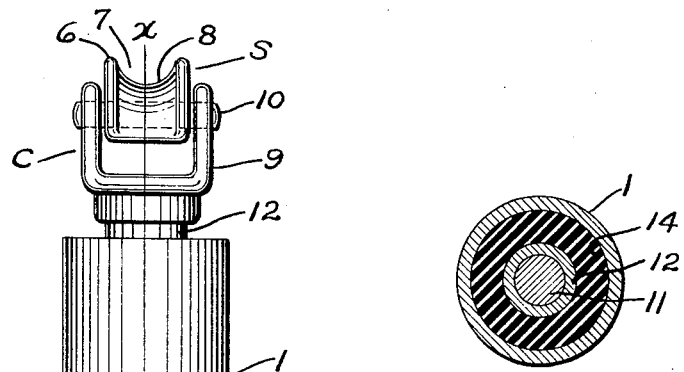
Fig. 2 is an end view of my invention.
Figure 3:
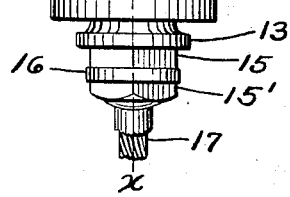
Fig. 3 is a sectional view on the line 3—3 of Fig. 1.

In the preferred embodiment of my invention I provide a body member B which has a cylindrical and tubular-shaped portion 1 and an attaching member 2. The attaching member is provided with a socket 3 into which extends the trolley pole 4 and secured thereto by means of the rivets 5. The member 2 may be solid and arranged to be inserted into the end of the trolley pole 4 which is usually tubular.

I employ also a shoe S which has flanges 6, a groove 7 and a longitudinal contacting surface 8 to engage the trolley wire. The shoe S is mounted in a clevis support C comprising the yoke-shaped portion 9 between the arms of which the shoe is pivotally supported by means of the rivet 10, and a stem portion 11.

Concentrically mounted within the member 1 is an elongated tubular member 12 with flange 13 at the lower end. The member 12 projects beyond the ends of the member 1 and is held in position with respect to the member 1 by means of an interposed tubular member 14 which has a surface union with the members 1 and 12.

I prefer to make the member 14 of a resilient, yielding deformable material such as vulcanized rubber and having a vulcanized or surface union with the members 1 and 12 such that the members 1 and 12 are yieldingly held in position relative to each other. The member 12 is yieldingly movable about its vertical axis $x$—$x$ and is also movable vertically relative to the member 1 and is further movable radially with respect to the member 1 and angularly with respect to the longitudinal axis of the member 1. In other words, the member 12 is universally movable relative to the member 1 within limits as measured by the amount of deformation of the member 14. The member 14 is constantly tending to return the members 1 and 12 to their normal relative position.

The member 11 mounted within the member 12 is held in position by means of the nut 15 and lock nut 15' and interposed between the nuts 15 and 15' is a terminal 16 to receive the cable 17 for conducting current from the shoe S.

As shown in Fig. 1 if the nut 15 is drawn up tightly the members 9 and 11 will be fixed relative to the member 12, that is, any movement of the members 9 and 11 will be transmitted to the member 12 which will move in unison therewith.

It is sometimes desirable to have the trolley shoe pivot about the longitudinal axis $x$—$x$ and in that case the nut 15 would not be drawn up tightly so as to bind the members 9, 11 and 12 against relative movement.

It is quite apparent also that if it is desired to provide the device with anti-friction means between the members 11 and 12 this could be easily accomplished by spacing the member 12 from the member 11 thus leaving a space in which could be positioned balls or ball bearings.

There is no relative movement at the surface of union of the rubber to the members 1 and 12 and any relative movement there may be of the members 1 and 12 is transmitted throughout the yieldable member 14 so that all parts of the member 14 are under action whenever relative movement occurs between the members 1 and 12. This is a decided advantage over a mechanical interlock between the member 14 with the members 1 and 12 as in the case of an interlock the movement between the parts would be localized around the interlocking means.

This invention differs from many in the prior art in that the axis x—x is held transverse to the longitudinal axis of the pole 4.

A wheel may be mounted on the support C in place of the shoe S by modifications which will be apparent.

Also the members 11 and 12 may be consolidated into a single member having a surface union with the rubber bushing 14.

The rubber bushing may be secured to the metal parts by a rubber or other cement; by first forming and then vulcanizing to the parts; or the union can be made at the time the bushing is formed by pressing the rubber compound into position between the metal parts and then vulcanizing.

The flange 13 may be made sufficiently large to engage with the member 1 in case of a tendency for the member 12 to be accidentally torn from the member 14 in an upward direction.

The greatest strain upon the member 11 is axially and downwardy and by placing the members 1, 11, 12 and 14 with their longitudinal axes vertical the stress upon the member 14 is distributed throughout its mass and there is less degree of deformation to the rubber than if the axis were substantially horizontal.

Modifications will suggest themselves to those skilled in the art, therefore, I wish to be limited only by my claims.

I claim:—

1. A trolley head comprising a socket member and means to secure the socket to a support, a concentrically positioned tubular member within the socket member and having a common axis, a member interposed between the tubular and socket members and formed of a resilient material, and having a surface union with the said members, a support comprising a stem portion mounted in the tubular member and a head portion to receive a current collector and means to conduct current from the support.

2. A trolley head comprising a socket member and means to secure the socket to a support, a concentrically positioned tubular member within the socket member and having a common axis, a member interposed between the tubular and socket members and formed of a resilient material, and having a surface union with the said members, a support comprising a stem portion mounted in the tubular member against relative movement thereto and a head portion to receive a current collector and means to conduct current from the support.

3. A trolley head comprising a socket member and means to secure the socket to a support, a concentrically positioned tubular member within the socket member and having a common axis, a member interposed between the tubular and socket members and formed of a resilient material, and having a surface union with the said members, a support comprising a stem portion swivelly mounted in the tubular member and a head portion to receive a current collector and means to conduct current from the support.

4. A trolley head comprising a tubular socket member and means to secure the member to a support, a tubular bushing member mounted within the socket member and having coinciding axes and spaced from the wall of the socket member, a resilient, deformable insulating member interposed between the socket and bushing members and having a surface union with one member, a support for a current collector having a stem portion mounted within the bushing member and means to prevent the unintentional removal of the support.

5. A trolley head comprising a tubular socket member, means to secure the socket to a trolley pole with the axis of the socket substantially vertical, a support having a head to receive a current collector and a stem member mounted within the socket member and having its axis common with that of the socket, a tubular member to receive the stem, an annular recess associated with the head into which the end of the tubular member projects, a deformable member of insulating material interposed between the tubular and the socket members and having a surface union with the members and means to conduct current away from the stem member.

6. A trolley head comprising a socket member and means to secure the socket to a support with its axis transverse to that of the support, a concentrically positioned tubular member within the socket member and having its axis coinciding with that of the socket, a resilient deformable insulating member interposed between the said members and secured to each against relative movement but permitting limited relative movement between the socket and tubular members, a current collector, means to secure the collector to the tubular member, the said means having a stem portion extending through the tubular member and having means to prevent detachment of the securing means.

7. A trolley head comprising a socket member and means to secure the socket to a trolley pole with the longitudinal axis of the socket transverse to the axis of the pole, an elongated tubular member mounted within the socket and spaced therefrom, a member of insulating material interposed between the socket and elongated member and secured to each member, non-reciprocating means mounted in the tubular member to support a current collector and means associated with the said means to adjustably secure it to the tubular member.

8. A support for a current collector comprising a tubular bushing of resilient deformable insulating material, a member secured to one of the side faces of the bushing and having means for attachment to a trolley pole and hold the axis of the bushing transverse to the axis of the pole, a tubular member secured to the other side face of the bushing and means for attachment to a current collector detachably secured to the tubular member, the said members movable relatively to each other depending upon the stress upon the members and the capacity of the bushing to deform.

9. A trolley head comprising a socket member and means to secure the socket to a support and hold the axis of the socket transverse to that of the support, an elongated member positioned within the socket member and having its axis coincide with that of the socket, a deformable member of rubber interposed between the socket and elongated members and having a surface union with each, supporting means for attachment to the elongated member and arranged to support a current collector and means associated with the supporting means to secure the supporting means to the elongated member against relative movement but permitting relative adjustment at will.

10. A support for a trolley head comprising a resilient tubular rubber bushing, a metallic member having a surface union with one face of the bushing, a part projecting laterally from said metallic member to secure the metallic member to a support and a second metallic member rotatably secured to the bushing and adapted to support a current collector and having a part projecting into the passage through the bushing and means on the end of the part to secure the part in place

GEORGE A. MEAD.